Patented July 7, 1953

2,644,931

UNITED STATES PATENT OFFICE 2,644,931

SUPERVISORY CONTROL SYSTEM

Willard A. Derr and Maurice E. Reagan, Pittsburgh, Pa., assignors to Westinghouse Electric Corporation, East Pittsburgh, Pa., a corporation of Pennsylvania Application March 28, 1952, Serial No. 279,182

10 Claims. (Cl. 340—163)

1

Our invention relates generally to supervisory control systems, and it has reference in particular to apparatus and systems for obtaining a telemetering indication of and/or operating a remotely located tap changing switch over a supervisory control system.

Heretofore, selective telemetering by means of supervisory control equipment has been initiated at the dispatching office, either by an operator or by means of a clock or the like.

One object of our invention is to provide for selective telemetering of the position of a movable device over a supervisory control system upon a change in position of the device.

Another object of our invention is to provide in a supervisory control system for obtaining position indications at a dispatching office of any number of automatic tap changing switches at a remote station without requiring more than a single pair of line wires.

Yet another object of our invention is to provide in a telemetering system which operates over the signal channel of a supervisory control system, for using a telemetering transmitter and receiver which operate in response to the relative durations of "on" and "off" intervals of a fixed time cycle, and for transmitting supervisory code signals during only the "off" portions of said signals.

It is also an object of our invention to provide in a supervisory control system for eliminating the usual supervision code after a point is selected and for, instead of connecting a telemetering transmitter and receiver for transmitting and receiving telemetering signals, indicating the position of a remotely located device.

It is an important object of our invention to provide in a supervisory control system for automatically transmitting and receiving a telemetering signal to determine the position of a movable device at a remote station, whether its position is changed manually or automatically.

Other objects will be apparent, and still other objects will be explained hereinafter.

According to one of the embodiments of our invention, a telemetering transmitter is located at a remote station for producing a telemetering signal in accordance with the position of a tap changing switch at the remote station. A telemetering receiver responsive to such signals is located at a dispatching office for indicating the position of the tap changing switch. The transmitter and receiver are selectively connected to operate over a signal channel between the dispatching office and the remote station by

2 means of supervisory control equipment which also operates over the same signal channel. The supervisory control equipment provides for either raising or lowering the position of the tap changing switch from the dispatching office under the control of the operator, or the tap changing switch may be connected for operation automatically in response to a voltage relay or the like. In either instance, the telemetering transmitter and receiver are connected for transmitting an indication of the position of the switch as soon as it has moved.

For a more complete understanding of the nature and scope of our invention, reference may be made to the following detailed description, which may be read in connection with the accompanying drawings, in which.

Figs. 1 through 4 of the drawings illustrate a supervisory control system which is basically substantially identical with that of Patent No. 2,091,301 which issued to Hans P. Boswau on August 31, 1937, entitled "Supervisory Control System." The first four figures of the drawings correspond substantially to Figs. 1 through 4 of the Boswau patent and the same numerals are used in connection with the different elements of Figs. 1 through 4 of the present application to identify the corresponding elements of Figs. 1 through 4 of the Boswau patent. Additions to the circuit and apparatus of the Boswau patent will be identified by numerals not appearing in the Boswau patent. Since the supervisory control equipment of the present application operates in substantially the same manner as is described in detail in the Boswau patent, it will not be necessary to trace the same circuits in the present application, and accordingly the present description will be directed primarily to changes and departures from the system of the Boswau patent.

In this respect, it will be noted that the series line relay circuit of the Boswau patent connecting the relays 200 and 400 of the patent has been changed to provide a parallel line circuit arrangement of the signal channel conductors 219 and 223 and a line supervision circuit incorporating a supervision relay 12, control relays 16 and 21, alarm relay 18 and alarm reset relay 20 has been incorporated, in substantially the same manner as is described in detail in Patent No. 2,409,840 which issued to M. E. Reagan and W. A. Derr on October 22, 1946.

Figure 1:
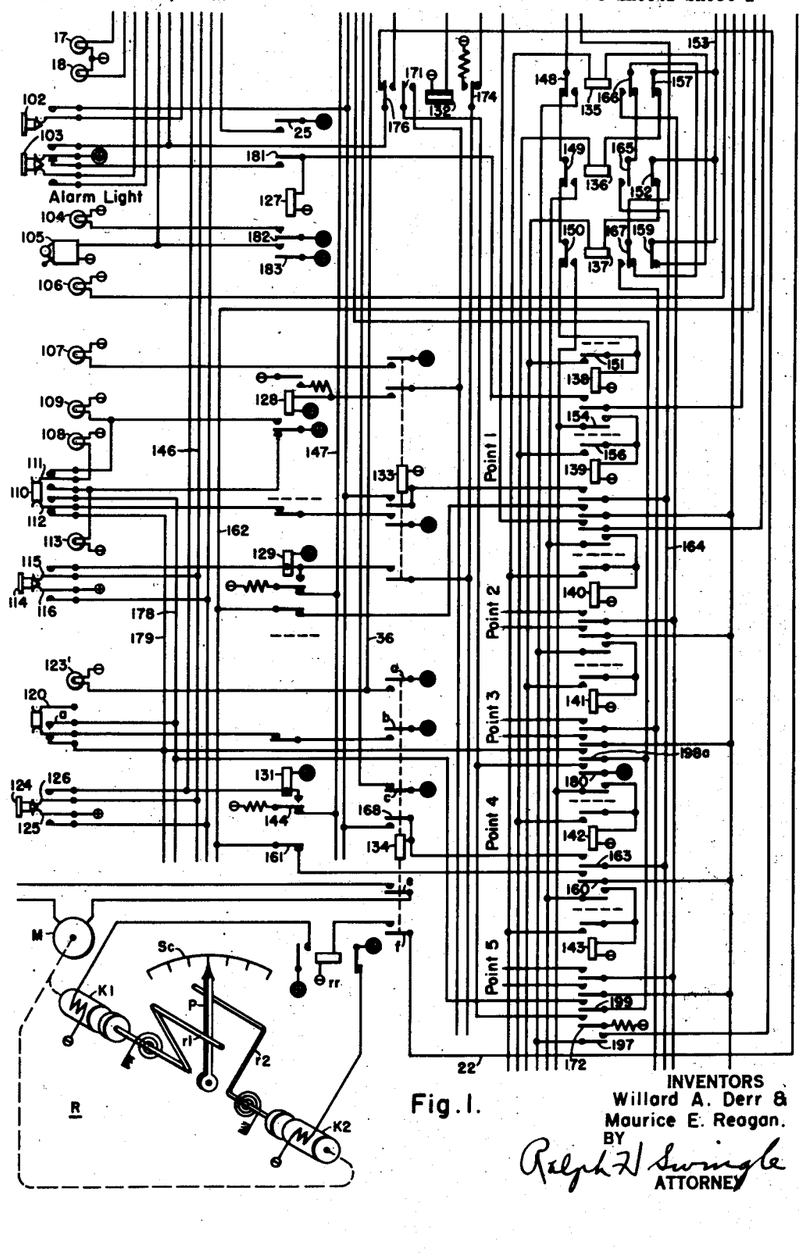
Figure 1 is a diagrammatic view of a telemetering receiver and the individual equipment and selecting relays at the dispatching office of a supervisory control system embodying the invention in one of its forms.
Figure 2:
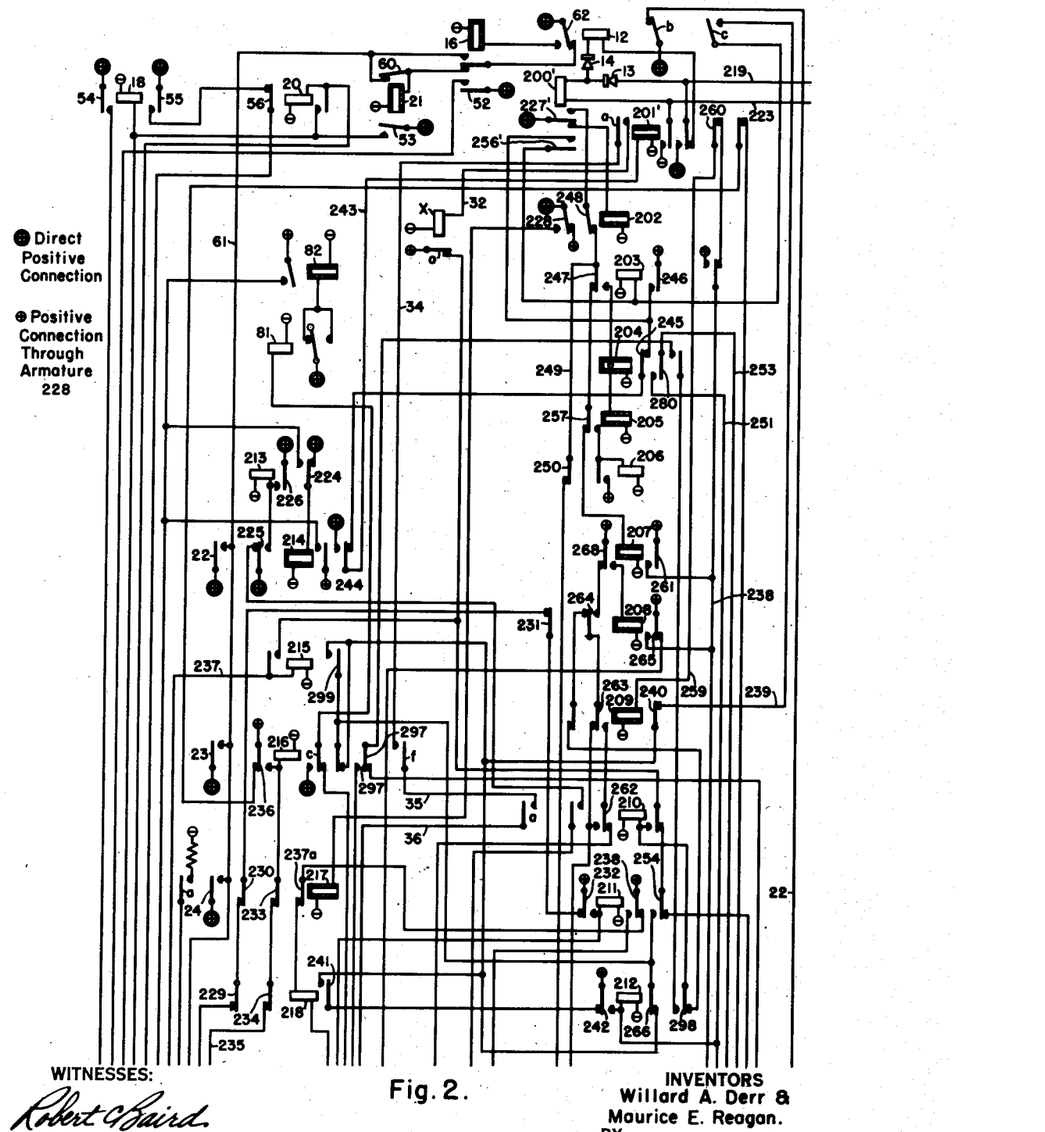
Fig. 2 is a diagrammatic view of the common equipment at the dispatching office.
Figure 3:
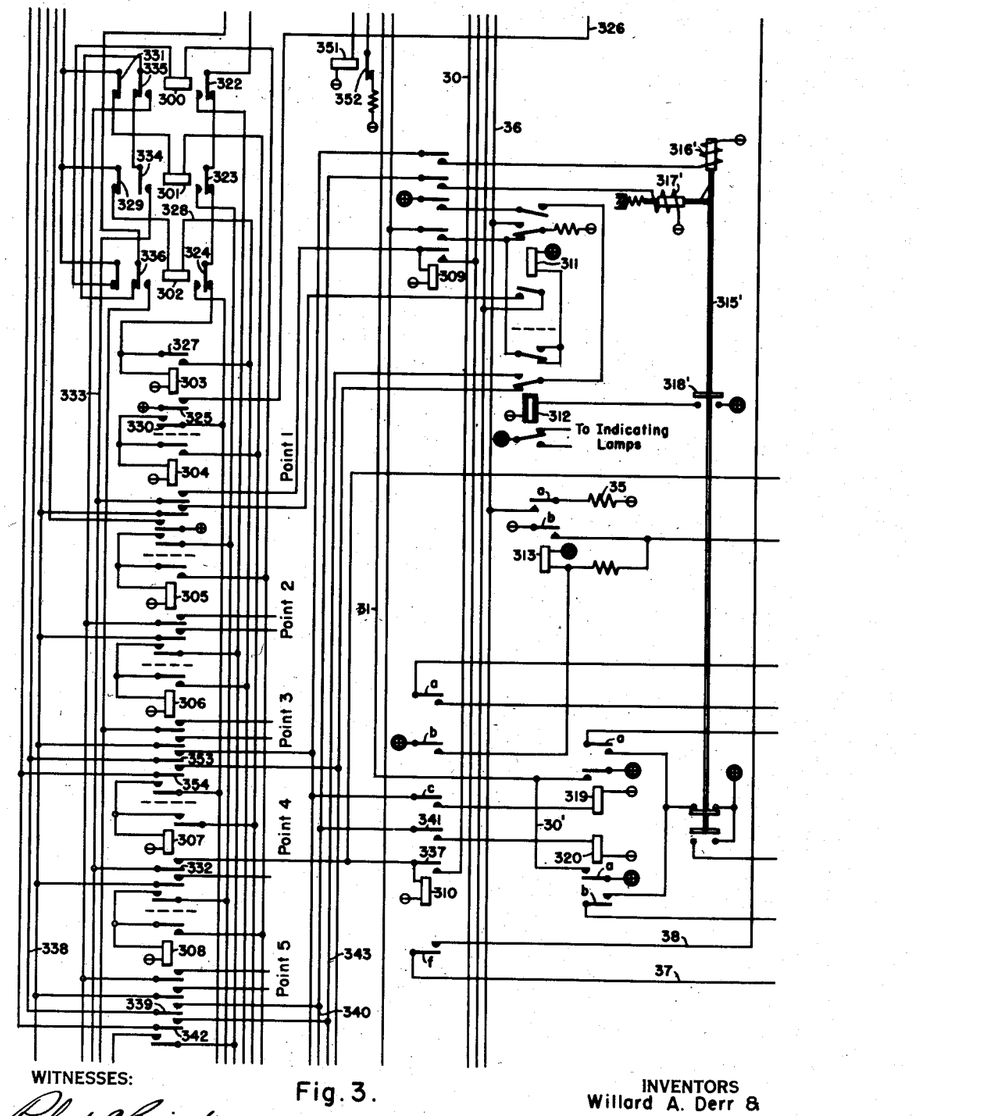
Fig. 3 is a diagrammatic view of the individual equipment and selecting relays at the remote station of a supervisory control system embodying the invention in one of its forms.
Figure 4:
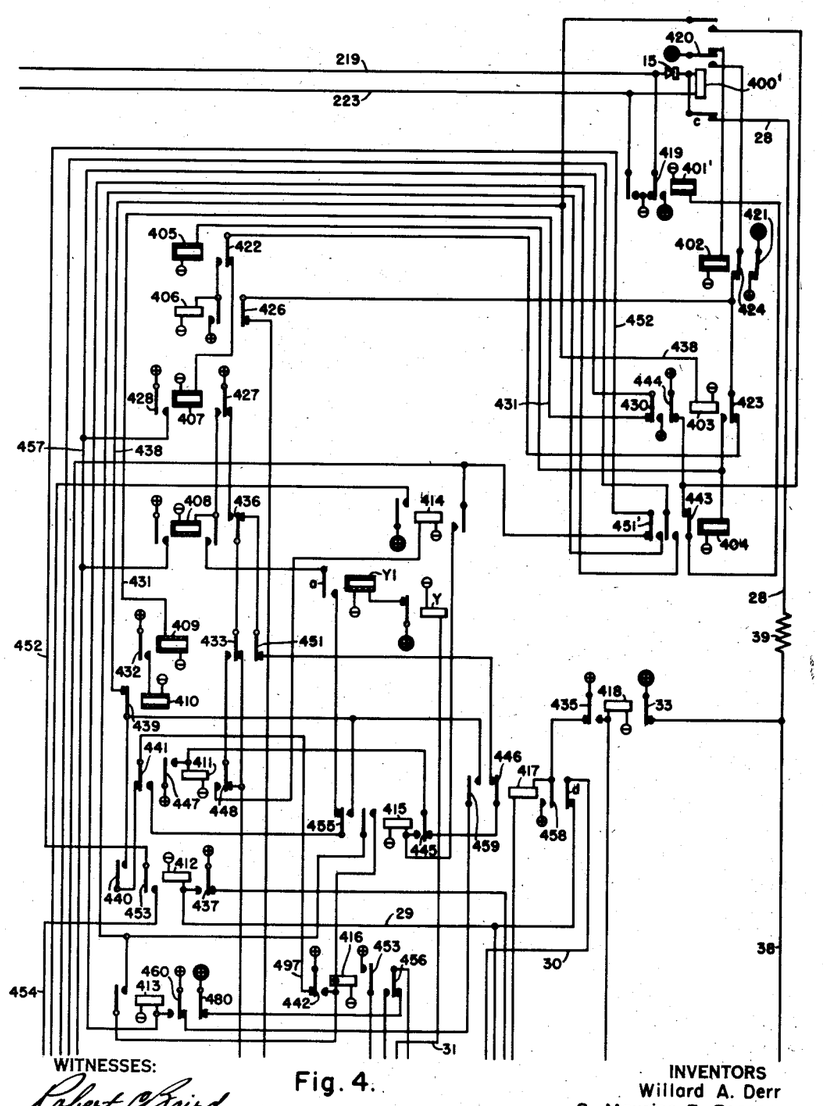
Fig. 4 is a diagrammatic view of the common equipment at the remote station.

In accordance with the present invention, the individual point relay 134 of Fig. 1 has been modified to provide for rendering effective a telemetering position indicator or receiver R in response to operation of the point relay upon receipt of the check code from the remote station during a manual operation, and in response to receipt of a point selection code from the remote station during an automatic operation.

The telemetering receiver R may comprise a pointer P disposed in operating relation with a scale Sc. Crank arms $r1$ and $r2$ are normally biassed to rest position to the left and right of pointer P, and are disposed to be actuated in opposite directions by means of a motor M through clutches $k1$, $k2$ for actuating the pointer P in opposite directions. The clutches $k1$ and $k2$ are selectively rendered effective through being energized by means of a receiver relay $rr$ which is disposed to be energized through an armature $f$ of the relay 134, conductor 22, and an armature $b$ of a line supervision relay 12, which is normally connected by means of rectifier devices 13 and 14 in series circuit relation with the operating winding of the line relay 200' and the conductors 219 and 223 of the signal channel, so as to be energized through armature $c$, and a normally closed or back contact of the line relay 400', conductor 28, resistor 39, and back contact and armature 33 of the substation receiving relay 418. The circuit for transfer relay 203 has included therein normally closed back contact and armature of line supervision relay 12, to prevent interference of the dispatching office supervisory equipment with the telemetering receiver operation.

Figure 5:
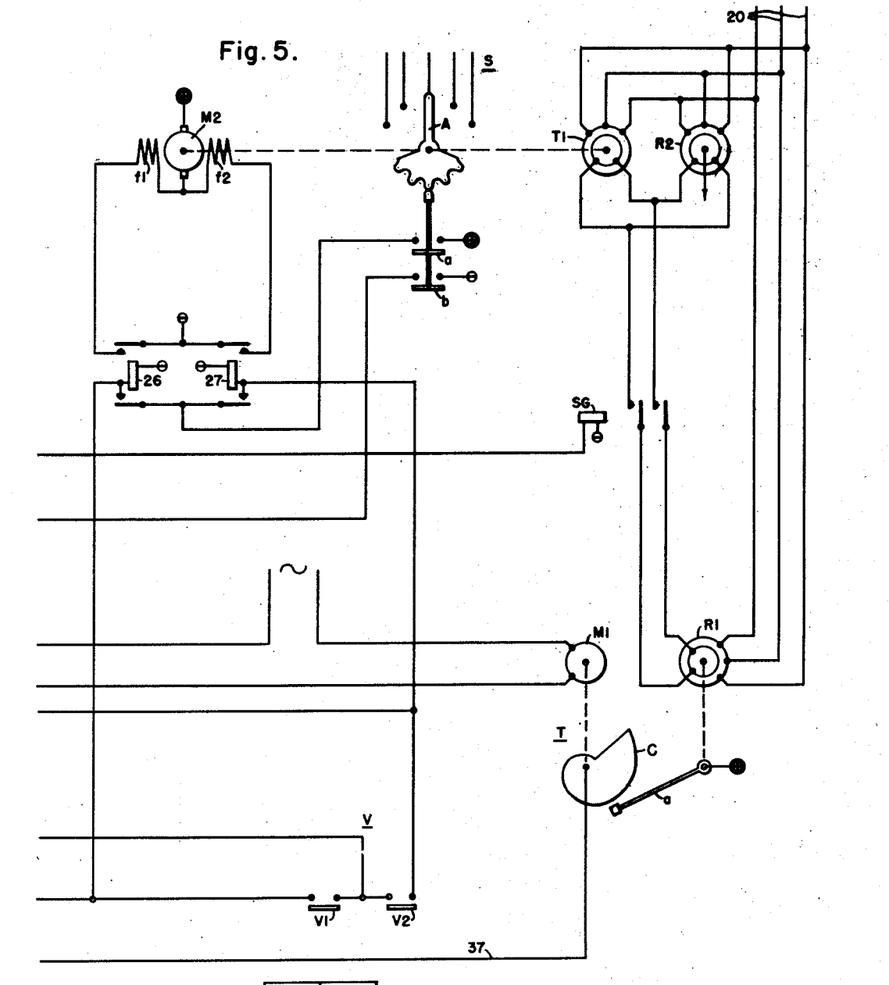
Fig. 5 is a diagrammatic view of the control circuits for a tap changing switch and a telemetering transmitter at the remote station.
Figure 6:
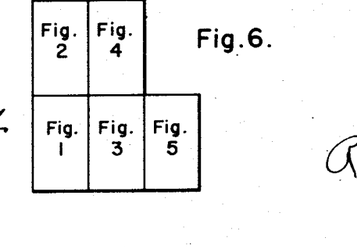
Fig. 6 shows the arrangement of Figures 1 through 5 to illustrate a supervisory control system embodying the invention in one of its forms.

At the remote station as shown in Fig. 5, a telemetering transmitter T is disposed to be connected to the signal channel through armature $f$ of the point relay 310 when the relay operates in response to receipt of a point selection code during a manual selection of the point, or in response to a check code from the dispatching office during an automatic operation.

The telemetering transmitter T may comprise a telemetering motor M1 which is arranged to be energized through an armature $a$ of the relay 310 to drive at a constant speed a cam-shaped contact C, which engages a contact arm $a$ for a variable portion of its fixed operating cycle, depending upon the angular position of the arm $a$. This position may be changed in accordance with the operating position of the arm A of a tap changing switch S, by means of a Selsyn system including a Selsyn transmitter T1 and a Selsyn receiver R1 having their rotors connected to the arm A and to the arm $a$, respectively, while their stators may be connected to a suitable polyphase alternating-current source represented by the conductors 20. The rotor windings may be electrically connected through a control relay SG. A local indicator such as the Selsyn receiver R2 may be connected in a parallel circuit relation with the transmitter T1 and receiver R1 if desired.

Operation of the tap changing switch S may be effected by means of a motor M2 under the control of "raise" and "lower" relays 26 and 27 arranged to selectively energize field windings $f1$ and $f2$ for operating the motor M2 in opposite directions to raise and lower the position of the arm A. Contact member $a$ of switch S provides holding circuits for the relays 26 and 27 between taps of the switch. Operation of the motor M2 may be effected under the control of automatic means such as a voltage relay V, or the like, represented by the contacts V1 and V2, or by means of lower and raise supervisory control relays 319 and 320, under the selective control of a transfer switch 315' having automatic and manual operating windings 316', 317', respectively, which may be selectively energized from the dispatching office through point 1 of the supervisory control equipment.

In order to provide for connecting the telemetering transmitter to the signal channel upon receipt of a point selection code from the dispatching office and prevent the transmission of the usual supervision code, the supervisory relay 313 may be shunted down through armature $b$ of the point relay 310. To prevent the supervision code from being transmitted upon an automatic operation, the circuit for normally energizing the supervision code relay 412 upon an automatic operation may be interrupted by means of armature $d$ and back contact of the substation start relay 417.

Since no supervision code is being transmitted from the remote station, relays Y and Y1 may be provided for interrupting the energizing circuit for relay 408 a predetermined time after receipt of the raise or lower operate code, so as to deenergize relay 408 and release the supervisory control relays at the remote station a predetermined time after operation of the raise or lower relays 319 or 320.

At the dispatching office, provision is made to release the supervisory control relays 210 and 215 which respectively stop the operation code and start it, so that successive operations of the tap changing switch may be made by an operator. Instead of the usual holding circuit for these relays being completed to indirect positive through an armature and front contact of each relay as in the Boswau patent, an auxiliary reset relay X having armatures and front contacts of relays 210, 216 and 201 in circuit therewith, is provided for interrupting the holding circuits by removing indirect positive when an operation is commenced from the dispatching office as soon as the supervisory control relay 210 operates. Reset of the individual point relay 131 is effected by connecting the relay through armature $a$ of the substation preference relay 217, since this relay is energized at the end of the control code.

A pendulum type time delay relay 81 and an auxiliary reset relay 82 are provided for resetting the supervisory equipment at the end of an automatic operation so as to provide a definite time interval for operating the telemetering receiver R to receive transmission of a telemetering signal from the remote station. The relay 81 is deenergized by relay 134 removing positive therefrom upon receipt of the selection code. The relay 81 provides, for example, a ten second interval before releasing relay 82 to pick up the reset relay 214, so as to insure receiving at least one complete five second cycle of the telemetering transmitter signal.

With the apparatus in the condition as shown, operation of the tap changing switch S may be effected by the operator pushing the point selection key 124 at the dispatching office for selecting point 4 at the remote station. The start relay 216 is energized in the usual manner through the point selection key, and the individual point relay 131 is shunted down through the point key in the manner clearly described in the Boswau patent hereinbefore referred to. When relay 216 is energized, an obvious energizing circuit is provided for timing relay 81 at armature c and front contact of relay 216 to prevent the timing relay from timing out. The relay 218 is energized through armature 144 of relay 131, and a point selection code of five pulses is transmitted by the driving relay 201' energizing and deenergizing the line conductors 219 and 223 to effect operation of the line relays 200' and 400' in the usual manner. The counting relays 138 through 142 operate in sequence, and at the end of the point selection code, relay 212 is energized to stop the operation of relay 201' and hence the transmission of impulses.

At the remote station, the line relay 400' operate on each impulse and substation receiving relay 418 is energized in the usual manner on the first impulse through armature 325 of counting relay 303. This latter removes the line supervision potential from the line conductors at armature 33 of relay 418, and at the dispatching office the line supervision relay 12 will momentarily be deenergized. Operation of the alarm relay 18 is, however, prevented by reason of the control relay 21 being of a time delay type.

The counting relays 303 through 307 operate in sequence with successive operations of relay 400' and as soon as the point selection code is received, the point relay 310 of point 4 at the remote station will be energized when counting relay 307 completes an energizing circuit therefor at armature 332. The supervision relay 313 is rendered ineffective by a shunt circuit through armature b of relay 310. The motor M1 of the telemetering transmitter is connected to a source of alternating current at armature a. Energizing circuits are set up for the lower and raise relays 319 and 320 through armature c and 341 of relay 310.

The check code is initiated by relay 412 which is picked up over the circuit through conductor 29, back contact and armature d of relay 417, conductor 30, front contact and armature 337 of relay 310, through the circuit described in detail in the Boswau patent when slow relay 407 drops at the end of the selection code. Upon receipts of the check code of five impulses at the dispatching office, point relay 134 is energized through a circuit completed by counting relay 142, connecting the motor M of the telemeter-receiver R to a source of alternating current at armature e, disconnecting relay 81 from positive at armature e to start timing out for reset, and connecting the receiving relay rr to positive at the armature b of the line supervision relay 12 through armature f and conductor 22. Since the line conductors 219 and 223 are energized through the telemetering transmitter T, for a portion of the telemetering cycle, in accordance with the position of the switch arm A, the relay rr will be energized for a variable portion of the fixed operating cycle of the cam C, depending on the position of the arm a. This means that the clutch K1 will be energized for a variable portion of the operating cycle of the transmitter, dependent on the position of the tap changing switch arm A. Accordingly, the actuating arm r1 will be actuated in a clockwise direction, for a distance dependent on the position of the arm A to move pointer P. At the end of the contact making portion of the cycle of the cam C, the line conductors will be deenergized and the receiving relay rr will return to the deenergized position shown. Thereupon, the clutch K2 will be energized and the actuating arm r2 will move a complementary distance so as to be effective to move the pointer P in a counterclockwise position, should it be necessary to do so to obtain a correct indication of the position of the tap changing switch arm A, such as will be the case when the pointer P indicates a previous higher reading.

Should the operator desire to raise the tap changing switch S, the operate key 120 may be placed in the position shown, whereupon he actuates the master control key 102. Relay 215 is thereupon energized in the usual manner, and the supervisory control equipment transmits an operate code of six pulses corresponding to the normal breaker closing code. At the end of this code, relay 414 is energized and at the remote station, the operate relay 414 is energized at the end of the code, as is point relay 308, to provide an energizing circuit for the "raise" relay 320, through conductor 338, armature 339 and front contact conductor 340, and armature 341 of relay 310. An energizing circuit is thereupon provided through armature b of relay 320 for raise relay 26 to effect operation of the motor M2 to raise the tap changing switch S one step. Energization of the "raise" relay 320 is controlled by relay Y, which is energized through armature a of relay 320, and conductors 30' and 31. Relay Y operates to release relay Y1 and reset the supervisory control relays at the remote station by deenergizing relay 408 at armature a, a predetermined time after operation of the point relay 310.

At the dispatching office, relay X is energized at the end of the check code when relay 210 is energized, over a circuit extending from negative through the winding of relay X, conductor 32, armature a and front contact of relay 201', conductor 34, front contact and armature f, conductor 35, front contact and armature a of relay 210, conductor 26 to positive at armature a of relay 134. This removes indirect positive from relays 215 and 210 at armature a of relay X, to reset these relays so that the operator may effect a subsequent operation of the tap changing switch S if desired. The telemetering receiver is immediately reconnected for operation to indicate the new position.

Since the operating circuit for the transfer relay 203 must be completed through armature C and back contact of relay 12, it will be seen that the operate code may be transmitted only during the "off" portion of the operating cycle of the telemetering transmitter T. As soon as the operate code is transmitted and the tap changing switch moves, contact member b of the tap changing switch attempts to operate the supervisory relay 313 to indicate a changed position, but is prevented by reason of the shunt through armature b of the point relay 310. Instead, at the end of the operation of the tap changing switch, which occupies less time than the "off" interval of the telemetering transmitter, the telemetering transmitter again returns to an "on" portion of its cycle, and the new position of the switch is indicated by the telemetering receiver R in response to the telemetering signal transmitted by the transmitter T.

To release the supervisory equipment, the release key 103 at the dispatching office may be pushed to effect operation of release relay 214. Relay 217 is energized upon deenergization of the slow release relay 202 in the usual manner, and provides an obvious energizing circuit for the individual point relay 131 through armature $a$ of relay 217, to return the equipment to normal.

To transfer the tap changing switch to automatic operation, the point selection key 114 associated with point 1 of the supervisory control equipment may be pushed to effect operation of the supervisory control equipment to select point relay 309 at the remote station in the usual manner. This connects the automatic and manual operating windings 316'' and 317'' of the transfer switch 315' to be selectively energized in response to transmission of either a close or a trip code. By turning the control twist key 110 to the trip position in which contacts 111 and 112 engage their inner contacts and pressing the master control key 102, the trip code of four impulses is transmitted and counting relay 307 operates to complete an operating circuit for operate relay 414. The winding 317' will be energized to release the transfer relay 315' to the deenergized position. In this position, an energizing circuit is provided for one or the other of the control relays 26 and 27 through the contacts V1 and V2 of an automatic control device such as a voltage relay V for selectively raising or lowering the position of the tap changing switch. A supervisory code is transmitted in the usual manner to indicate by means of lamp 113 that switch 315' is in the automatic position.

Should the operating position of the tap changing switch be raised, contact $b$ of the tap changing switch closes, and provides an obvious energizing circuit for the supervisory relay 313. Since the point relay 310 is not energized at this time, the relay 313 will operate to the energized position. This results in energization of relay 417 to send the point selection code in the usual manner. The circuit for relay 417 extends from negative through resistor 35, armature $a$ and front contact of relay 313, conductor 36 to the operating winding of relay 417 and back contact and armature 435 of relay 418 to positive.

In response to receipt of the point selection code, point relay 134 will be energized at the dispatching office, resulting in connection of the telemetering receiving relay R for operation. Relay 211 is energized in the usual manner to effect transmission of a check code, which is stopped by energization of relay 210 at the end of the check code at the remote station.

The usual circuit for energizing relay 412 to start sending a supervision code is interrupted at armature $d$ of relay 417. Relay 418 is energized in response to the first pulse of the check code and removes positive from the line conductors at armature 33. At the end of the check code, the point relay 310 is energized and connects the telemetering transmitter T for transmitting a position indicating signal by energizing the line conductors 219 and 223 through conductor 37, armature $f$ of the point relay, conductor 38, resistor 39, conductor 28, and armature $c$ of line relay 400'.

At the dispatching office, operation of point relay 134 removes battery positive from the timing relay 81 at armature $c$, and relay 81 which is of the pendulum type, times out an operating interval which is greater than the operating cycle of the transmitter T. Accordingly, the receiver R remains connected to be energized in accordance with the "on" portion of the telemetering signal for at least one complete telemetering cycle. At the end of the timed interval provided by the relay 81, relay 82 is deenergized and provides an obvious energizing circuit for the reset relay 214 through armature $b$ of the battery relay 213, which is a normally energized relay. The supervisory equipment at the dispatching office is thereupon reset, in the manner described in Boswau, disconnecting the receiver R at the end of the telemetering cycle so as to afford an accurate position indication of the tap changing switch S. The supervisory equipment at the remote station is reset in the usual manner when relay 202 is deenergized for the long pulse interval in response to operation of reset relay 214.

From the above description and the accompanying drawings, it is apparent that we have provided in a simple and effective manner for always obtaining a correct indication of the operating position of a movable device such as a tap changing switch or the like at a remote station. By utilizing a telemetering transmitter having a variable "on" portion of a fixed operating cycle and transmitting supervisory control signals during the "off" portion of the telemetering cycle, a substantially continuous indication of the operating position of the remotely located device may be readily obtained without interfering with the operator's control thereof. In accordance with the embodiments of our invention, the telemetering indication may be initiated from either the dispatching office or the remote station, so as to at all times afford an accurate indication of the position of the device. While the invention has been described as applied in connection with a tap changing switch in conjunction with supervisory control equipment operating over a pair of line wires, it will be realized that the same arrangement could also be used for supervisory control operation over carrier frequency or microwave signal channels. Likewise, an indication could be transmitted for any telemetered quantity for which a contact could be made to close or open in response to a change in the telemetered quantity. While only a single telemetering indication is effected in the system herein described, it will be apparent that additional receivers may be used on other points at the dispatching office, and a single transmitter may be connected to transmit indications from the corresponding points at the remote station upon selection from the dispatching office.

Since certain changes may be made in the above-described construction and different embodiments of the invention may be made without departing from the spirit and scope thereof, it is intended that all the matter contained in the above description and shown in the accompanying drawings shall be considered as illustrative and not in a limiting sense.

We claim as our invention:

1. In a supervisory control system, a telemetering transmitter at a remote station, a telemetering receiver at a dispatching office, supervisory control equipment at both the remote station and dispatching office including impulse sending and receiving relays, counting means at each of the station and office operable in response to operation of the sending relays to transmit selection and check codes to selectively operate the receiving relays to first select a point at one location from the other and then check it, a switch at each of said locations operable in response to receipt of a selection or check code by the supervisory equipment at said location to condition the telemetering equipment at said location for operation, and a switch at said location operable to initiate operation of its counting means to cause its sending relay to transmit a selection code.

2. In a telemetering system, supervisory control equipment at a dispatching office including a sending relay, counting means controlling the sending relay, control means for effecting operation of the sending relay to transmit a code of impulse signals in accordance with a circuit condition of the counting means, a telemetering receiver, a receiving relay for operating the counting means to effect connection of the telemetering receiver to receive telemetering signals, and discriminating means selectively responsive to telemetering signals operable to prevent operation of the sending relay during receipt of a telemetering signal.

3. In a supervisory control system, a telemetering transmitter at a remote station, a telemetering receiver at a dispatching office, supervisory control equipment at the dispatching office including receiving and sending relays, a relay operable in response to predetermined operation of the receiving relay to connect the telemetering receiver for response to the transmitter, supervisory control equipment at the remote station including sending and receiving relays, a relay at the remote station operable in response to predetermined operation of the remote station receiving relay to connect the transmitter for transmitting coded position signals, and means at each of the office and station for effecting operation of the supervisory equipment at the particular location to select an associated point of the equipment at the other location and effect operating connection of the telemetering transmitter and receiver.

4. In a telemetering system, a telemetering transmitter at a remote station, supervisory control equipment at the remote station including sending and receiving relays and counting means for effecting operation of and operating in response to the sending and receiving relays, a relay for effecting operation of the transmitter in response to a predetermined signal from a dispatching office, a telemetering receiver at the dispatching office, supervisory control equipment at the dispatching office including sending and receiving relays and counting means operable to control operation of and in response to operation of said sending and receiving relays, a relay operable in response to predetermined operation of the receiving relay to connect the telemetering receiver to respond to operation of the telemetering transmitter.

5. In a supervisory control system for a tap changing device at a remote location movable to a plurality of operating positions, a telemetering transmitter responsive to movement of the tap changer, a telemetering receiver at a dispatching office operable to follow the position of the transmitter, a switch operable in response to movement of the tap changing device, supervisory control equipment at the remote location operable in response to operation of said switch to transmit a point selection code, supervisory control equipment at the dispatching office operable in response to said selection code to condition the telemetering receiver for operation and transmit a check code, said supervisory control equipment at the remote station being operable in response to said check code to condition the telemetering transmitter for operation.

6. In a supervisory control system for a device located at a remote station, supervisory control equipment at a dispatching office including impulse sending and receiving relays and counting means operable to control operation of the sending relay to transmit a predetermined selection code of impulses, supervisory control equipment at the remote station including sending and receiving relays and counting means operable in response to operation of the station receiving relay, a relay operable in response to operation of the counting means in response to said selection code to condition the transmitter for transmitting a telemetering code and effect operation of the remote station supervisory control equipment to transmit a check code of impulses, said supervisory control equipment at the dispatching office being responsive to said check code to condition the telemetering receiver for receiving the telemetering code, and relay means at the dispatching office selectively responsive to at least a portion of the telemetering code to prevent operation of the supervisory control equipment from the dispatching office during said portion.

7. Supervisory control apparatus for controlling a telemetering receiver which operates in response to a variable interval of energization in a fixed time cycle comprising, a sending relay, counting means for selectively effecting operation of the sending relay to produce impulse signals, a receiver relay operable in response to an incoming code of impulse signals to effect operation of the counting means, a start relay operable to effect operation of the counting relays to cause the sending relay to transmit a point selection code, a point relay operable in response to operation of the counting means in response to a check code of impulse signals to connect the telemetering receiver to a source of electrical energy for receiving, and a relay selectively responsive to different characteristics of the impulse signals and the telemetering cycle to prevent starting another supervisory control operation during the energized portion of the telemetering cycle.

8. Supervisory control apparatus for a telemetering receiver comprising, a sending relay, means including a counting circuit connecting the sending relay to produce a predetermined selection code, a receiving relay, a point relay operable to connect the telemetering receiver to operate in response to a telemetering signal, means including said counting circuit for effecting operation of the point relay in response to predetermined operation of the receiving relay, and means including a relay selectively responsive to the telemetering signal operable to prevent operation of the sending relay during receipt of the telemetering signal.

9. Supervisory control apparatus for a telemetering transmitter operable to produce a variable duration impulse in response to the position of a movable element, a sending relay operable to produce impulse signals, means including a counting circuit and switch means responsive to movement of said movable element for effecting operation of the sending relay to produce a point selection code of impulses, a receiving relay operable in response to a predetermined check code signal, a point relay, and means including the receiving relay and the counting circuit for effecting operation of the point relay at the end of said check code to connect the telemetering transmitter for transmitting a telemetering signal indicative of the present position of the movable element.

10. Supervisory control apparatus for a telemetering transmitter connected in operating relation with a tap changing switch at a remote substation comprising, a sending relay, a supervisory relay operable in response to movement of the switch, means including the supervisory relay and a counting circuit for effecting operation of the sending relay to produce a selection code of a plurality of impulse signals of one polarity, a point relay, a receiving relay, means including the counting circuit and the receiving relay for effecting operation of the point relay in response to a particular check code of impulse signals to connect the telemetering transmitter for transmitting a telemetering signal of the opposite polarity and having a duration dependent on the position of the tap changing switch.

WILLARD A. DERR.
MAURICE E. REAGAN.

References Cited in the file of this patent

UNITED STATES PATENTS

| Number | Name | Date |
| --- | --- | --- |
| 2,443,351 | Green | June 15, 1948 |

FOREIGN PATENTS

| Number | Country | Date |
| --- | --- | --- |
| 339,643 | Great Britain | Dec. 12, 1930 |
| 359,576 | Great Britain | Oct. 29, 1931 |
| 412,715 | Great Britain | July 5, 1934 |
| 425,561 | Great Britain | Mar. 18, 1935 |